(12) United States Patent
Salvinelli et al.

(10) Patent No.: US 12,504,420 B2
(45) Date of Patent: Dec. 23, 2025

(54) DEVICE FOR MEASURING FINENESS AND MATURITY OF COTTON FIBERS

(71) Applicant: MESDAN S.P.A., Puegnago del Garda (IT)

(72) Inventors: Gabriele Salvinelli, Puegnago del Garda (IT); Antonio Righettini, Salò (IT); Antonio Zampatti, Rezzato (IT); Simone Gabella, Prevalle (IT); Giuseppe Pace, Roè Volciano (IT); Marco Musesti, Gavardo (IT)

(73) Assignee: MESDAN S.P.A., Puegnago del Garda (IT)

( * ) Notice: Subject to any disclaimer, the term of this patent is extended or adjusted under 35 U.S.C. 154(b) by 294 days.

(21) Appl. No.: 18/378,231

(22) Filed: Oct. 10, 2023

(65) Prior Publication Data
US 2024/0125761 A1    Apr. 18, 2024

(30) Foreign Application Priority Data
Oct. 14, 2022    (IT) .................. 102022000021192

(51) Int. Cl.
*G01N 33/36*    (2006.01)
(52) U.S. Cl.
CPC .................. *G01N 33/362* (2013.01)
(58) Field of Classification Search
CPC .................................................. G01N 33/362
See application file for complete search history.

(56) References Cited

U.S. PATENT DOCUMENTS

| 3,111,836 A | 11/1963 | Emmons, III |
| 3,116,629 A | 1/1964 | Gross |

(Continued)

FOREIGN PATENT DOCUMENTS

| CN | 2085518 U | * | 9/1991 |
| CN | 102116727 A | * | 7/2011 |

(Continued)

OTHER PUBLICATIONS

Machine translation of CN 102116727 A (Year: 2011).*

(Continued)

*Primary Examiner* — Nathaniel J Kolb
(74) *Attorney, Agent, or Firm* — Element IP, PLC

(57) ABSTRACT

A device measuring the fineness and/or maturity of cotton fibers contains a measuring chamber accommodating a cotton fiber sample and a tubular plunger. The measuring chamber extends between a first end closed by a wall having one or more vent holes and a second end opposed to the first end and hermetically closed. The plunger penetrates within the measuring chamber through the second end to run at least two strokes of predetermined lengths and has an inner channel extending between a tail portion and a perforated head portion placing the inner channel in fluid communication with the measuring chamber. The device further contains a reservoir placed upstream of the inner channel and in fluid communication with the inner channel; a pump filling the reservoir with air from an environment; and a flow regulator placed downstream of the reservoir and upstream of the inner channel. The flow regulator doses the air accumulated in the reservoir into the inner channel, and consequently into the measuring chamber, with a predetermined flow rate.

7 Claims, 2 Drawing Sheets

(56) References Cited

U.S. PATENT DOCUMENTS

| | | | | |
|---|---|---|---|---|
| 5,892,142 | A | * | 4/1999 | Ghorashi ............. G01N 33/362 73/38 |
| 5,907,394 | A | * | 5/1999 | Ghorashi ............. G01N 33/362 356/73.1 |
| 10,024,839 | B2 | | 7/2018 | Righettini et al. |

FOREIGN PATENT DOCUMENTS

| | | | | |
|---|---|---|---|---|
| EP | 0311569 A1 | * | 4/1989 | ............. D01G 99/00 |
| EP | 0373058 A1 | | 6/1990 | |

OTHER PUBLICATIONS

Machine translation of CN 2085518 U (Year: 1991).*
Machine translation of EP 0311569 A1 (Year: 1989).*
Search Report and Written Opinion issued Apr. 13, 2023 in Italian Patent Application No. IT 202200021192, 7 pages.

* cited by examiner

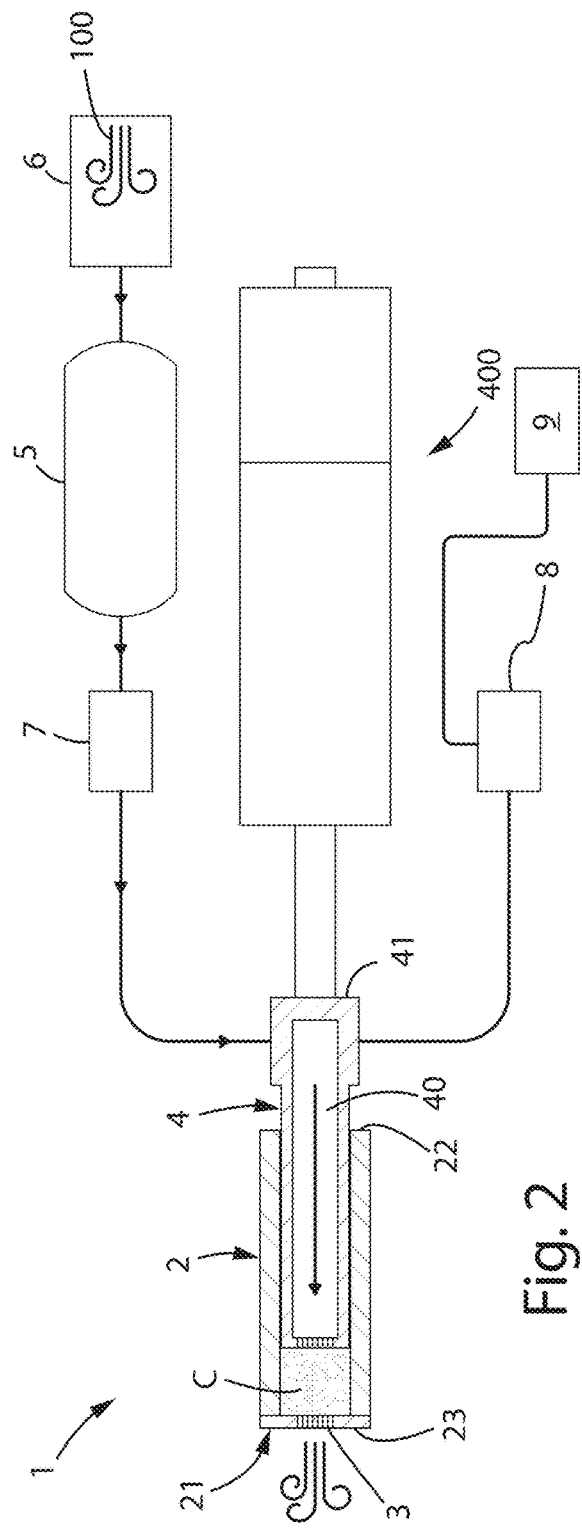
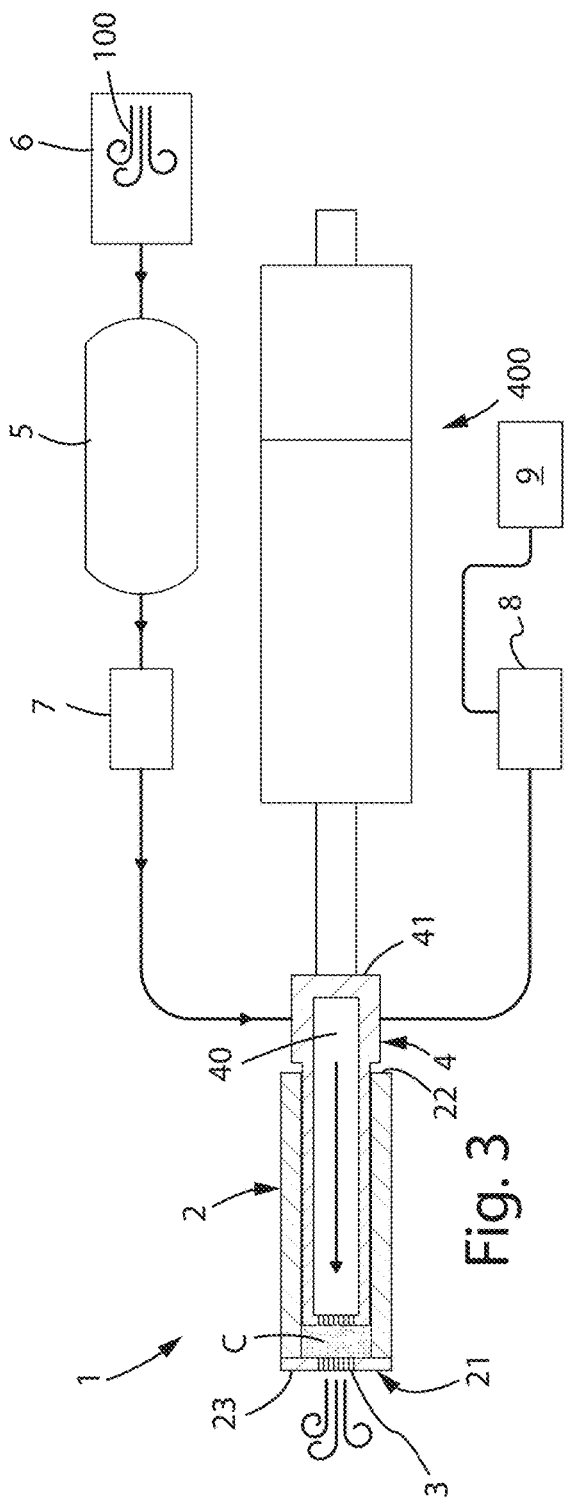

DEVICE FOR MEASURING FINENESS AND MATURITY OF COTTON FIBERS

The present invention refers to a device for measuring the fineness and maturity of cotton fibers.

The present invention is usefully employed for characterizing cotton fibers and for determining the quality thereof.

The quality of the cotton fibers is known to be determined by their colour, by the contents of imperfections, such as for example knots or tangles of fibers ("neps"), and impurities, such as residuals of insects or vegetables (for example fragments of seeds), by the degree of stickiness, by the contents of humidity, by the length and by the dynamometric characteristics (the tensile elongation or stretching before failure and the tensile strength, i.e., the maximum applicable tensile load before breaking) and by the so-called characteristics of fineness and maturity of the fibers.

As known, before being spun, the cotton is generally disposed in the form of bales, and not in the form of clean and regular fibers. Indeed, the natural fiber, when collected, is ginned so as to separate the foreign bodies, and then pressed in cotton fiber bales.

In order to process a cotton bale, a spinner needs to know the technical characteristics of the cotton fibers forming the bale in order to know how to set the equipment for processing cotton.

In this regard, classifying the bales particularly through the above-mentioned characteristics of fineness and maturity is known. For this reason, measuring these characteristics in relation to the rough fibers is useful.

With reference to the measurement of the fineness and maturity of cotton fibers, it should be considered, as known, that the cotton fibers have a helicoidal trend and are not full, but hollow.

Particularly, the mature fibers have a hollow cross section and appear as a flattened floss whose inside consists of a cellulose solid part (cell wall) delimiting the hollow part, i.e., the so-called lumen.

Specifically, the maturity of a fiber indicates the relative degree of development of the fiber wall and is particularly given by the ratio between the total area and the actual area of the cellulose wall.

Therefore, the maturity is a quantification of the thickness of the cellulose wall.

Regarding the fineness, it is measured by an index known in the field as Micronaire. Indeed, the Micronaire represents the linear density of a cotton fiber and is given by the ratio between the weight and the length of the cotton fiber. In addition to representing the fineness of a fiber, the Micronaire is also indicative of its degree of maturity.

Devices for measuring the fineness and maturity of the cotton fibers operating by flowmetric methods are known, in which a known quantity of fibers in the free and non-oriented state is enclosed within a measuring chamber of known size and is passed through by an air flow. For this reason, the measuring chamber is for example a cylindrical body having a resistance at the bottom, for example given by a holed wall.

The fineness and maturity of the fibers are indirectly determined by the pressure losses at the ends of the measuring chamber due to the resistance opposed by the fibers to the air flow passing through the measuring chamber itself in determined compression conditions.

Indeed, it is known that there is a direct proportionality between the compactness of the material and its physical properties. Such principle is ruled for example by standards ISO 2403 2014 and UNI EN ISO 10306.

After preparing the material and inserting the same into the measuring chamber, a plunger presses the chamber, and thus the sample, in a predefined manner while a calibrated air flow, for example at 4 l/minute, is made to flow inside the chamber. Therefore, the pressure drop resulting from the air leaking from the chamber is measured.

In particular, a low pressure drop indicates that less air passes through the sample and thus that the latter is denser and fuller, i.e., more mature. Instead, a high pressure drop is indicative of a less dense, emptier, and thus less mature sample.

A single compression is known to allow to calculate the Micronaire, and thus to obtain the fineness.

If a second compression is carried out with a second air flow, the maturity can be also obtained.

Therefore, the maturity of cotton fibers is known to be measured by measuring the resistance to the air flow of a mass of cotton fibers in two different pressure conditions, according to the standards.

If only one compression is available, instead, only the fineness (i.e., Micronaire), and not the maturity, can be measured.

Three main typologies of instruments for measuring such characteristics are known.

A first type of instrument provides a single compression and does not follow in toto the standard as partially altering it in order to obtain in a short time a measure data which is statistically significant. Such instrument is arranged to perform the measure on hard material with the impurities inside (i.e., in the form of a bale, only partly cleaned and pressed) and not on the clean material. The instrument has a very easy use, accessible to all, and provides the data in a few seconds. However, since a double compression is not provided, such instrument just measures the Micronaire and does not allow to measure the maturity.

A second type of instrument provides a double compression and thus allows to obtain data related to the maturity, in addition to the fineness.

Such second type of instrument is very complex and can be used only by specialized textile operators. Furthermore, the material should be accurately prepared and performing the measures requires long time. For such reasons, such instrument reduces the statistical validity of the obtained measures.

The equipment of the first type uses plant compressed air for generating the air flow in the chamber, and which is thus passed inside the sample. Such air is dry and however subjected to unpredictable variation conditions but, since this is in contact with the material only for a few seconds (10 seconds), does not alter it.

Instead, in the equipment of the second type measuring the maturity, the air passes for 1-2 minutes through the sample and thus the air needs to be regulated not to alter the characteristics of the sample. For this reason, the dry compressed air which is used in case of first type instrument is not suitable to measure the maturity, but air is used in predetermined relative humidity and temperature conditions, according to standard ASTM D1776. Such standard particularly provides a temperature of 21° C.±1° C. and a relative humidity equal to 65%±2%.

Therefore, in this way, the air can pass through the sample without altering characteristics thereof.

Particularly, the conditioned air in equipment of the second type is sucked in known conditions by a vacuum pump and by a screw flow regulator by passing it through the sample.

Since the sucked air is taken directly from the external laboratory environment, indeed, the air flow needs to be continuously regulated at maximum values of 4 liters/minute.

Disadvantageously, the first type instruments, which do not require air conditioning, measure only the Micronaire. Furthermore, disadvantageously, the employed compressed air is subjected to strong excursions of relative humidity and temperature, hardly to regulate within the limits of standard ASTM D1776, and therefore results in non-stable measures due to the permeability of the material in question, especially in the long term.

On the other hand, disadvantageously, in second type instruments, requiring conditioned air, the conditioned air is provided to the measuring chamber by taking it directly from an external environment. The obtained measures result to be subjected to instability in their accuracy, as they suffer from perturbations of the air in the space adjacent to the instrument.

Disadvantageously, furthermore, the second type instruments require prolonged stabilizing time for achieving the instrumental conditions ideal for measuring such as to meet the requirements of standards (ISO 2403 2014, UNI EN ISO 10306).

A third typology of equipment allows to obtain both the fineness, and the maturity, but based on an alternative method not following the standard. Indeed, the measure is not based on a pressure drop, but an optical measure which is indirectly related to the maturity is carried out. Such instrument also requires the preparation of the material. Indeed, the sample is not in the form of hard cotton but is semi-finished, i.e., cleaned, stretched, and combed in the form of a ribbon.

An underlying object of the present invention is to overcome the above-mentioned drawbacks and particularly to ideate a measuring device which allows to measure both the fineness and also the maturity of cotton fibers effectively and in stable conditions, making the measures independent of the external perturbations in the space adjacent to the instrument.

A further object of the present invention is to provide a measuring device which allows to maintain the fibers intact and unaltered during the measurement.

A further object of the present invention is to provide a measuring device which allows to obtain accurate and repeatable measures, in accordance with what is provided by the conditions of the applicable standards regarding double compression measurement.

The mentioned objects, and other objects which will better appear below, are achieved by a measuring device comprising the characteristics set forth in the independent claim 1.

Further characteristics of the measuring device are provided in the dependent claims.

The characteristics and advantages of the measuring device will be more apparent from the following description of preferred but non-exclusive embodiments of a measuring device, illustrated for indicative but non-limiting purposes in the attached drawings in which:

FIG. 2 shows the measuring device of FIG. 1 in a first operating step;

FIG. 3 shows the measuring device of FIG. 1 in a second operating step.

Figure 1:
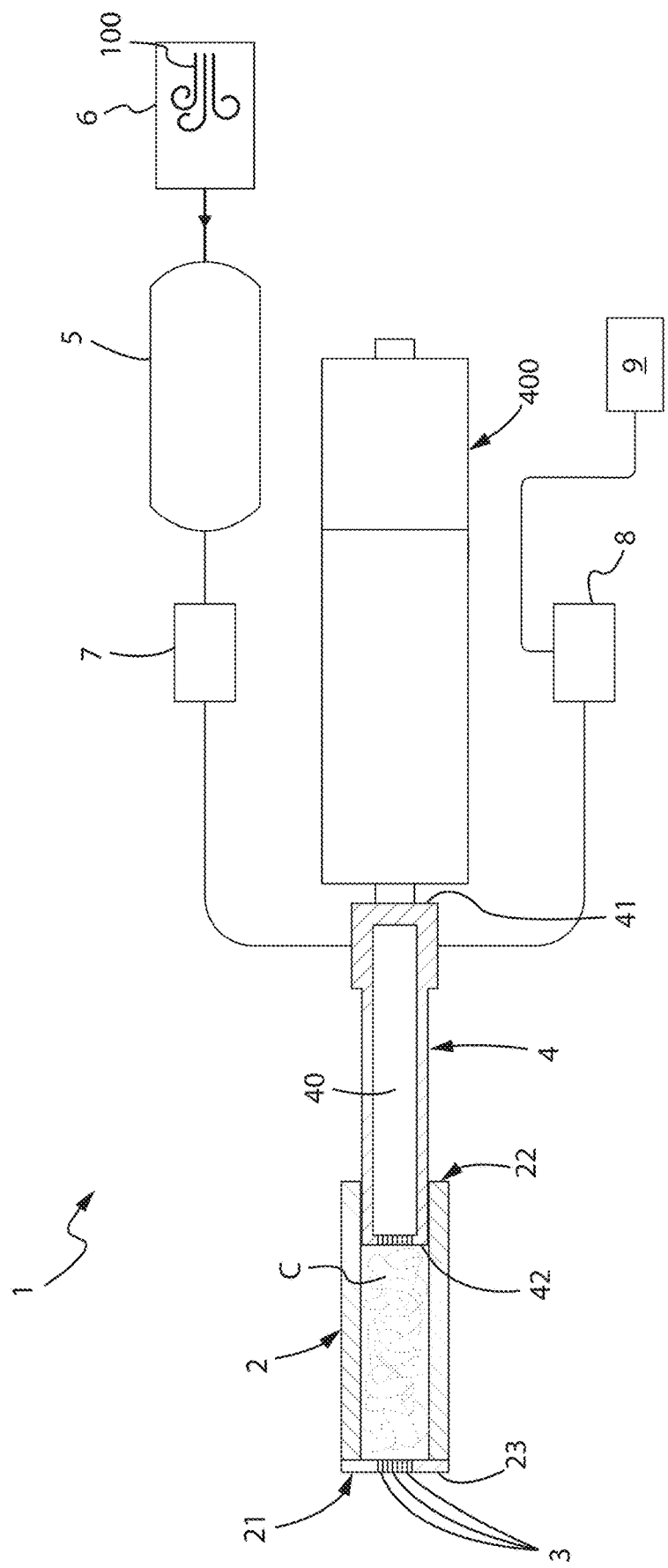
FIG. 1 shows a diagram of a measuring device according to the present invention.

With reference to the attached figures, a measuring device, indicated by reference number 1, is described below.

The measuring device 1 according to the present invention and described below allows to measure the fineness and/or maturity of cotton fibers.

Particularly, the measuring device 1 comprises a measuring chamber 2 configured to accommodate a sample C of cotton fibers.

The measuring chamber 2 extends between a first end 21 and a second end 22 opposed to the first end 21.

In more detail, the first end 21 is closed by a wall 23 having one or more vent holes 3 and the second end 22 is hermetically closed.

Particularly, the wall 23 is manually openable or removable in order to allow to insert or extract the sample C into or from the measuring chamber 2.

The measuring device 1 comprises a tubular plunger 4 configured to penetrate within the measuring chamber 2 through the second end 22 to run at least two strokes of predetermined lengths.

In other words, the plunger 4 is configured to work in two different compression conditions.

In this way, both the fineness, expressed as Micronaire, and the maturity can be calculated.

The plunger 4 has an inner channel 40 extending between a tail portion 41 and a head portion 42. The head portion 42 is perforated and places the inner channel 40 in fluid communication with the measuring chamber 2.

It should be particularly noted that the second end 22 is hermetically closed by a gasket (not illustrated in the attached figures) which is interposed between the plunger 4 and the measuring chamber 2.

According to the present invention, the measuring device 1 comprises a reservoir 5 which is placed upstream of the inner channel 40 and in fluid communication with the inner channel 40.

More details about the reservoir 5 are explained below in the present description.

The measuring device 1 further comprises a pump 6 configured to fill the reservoir 5 with air 100 from an environment.

Such environment is preferably a conditioned or air-conditioned environment, in which the air follows the specifications set by standard ASTM D1776.

The measuring device 1 comprises a flow regulator 7. The flow regulator 7 is placed downstream of the reservoir 5 and upstream of the inner channel 40. The flow regulator 7 is configured to dose the air 100 accumulated in the reservoir 5 into the inner channel 40, and consequently into the measuring chamber 2, with a predetermined flow rate.

Therefore, the reservoir 5 allows to accumulate conditioned air 100 so that it is already available when a measurement is to be performed, and that there is no need to load the measuring chamber 2 with air directly sucked from the external environment.

Advantageously, the obtained measures are independent of possible external perturbations of the air in the space adjacent to the instrument.

Particularly, the reservoir 5 is adapted to preserve specific characteristics of relative humidity and temperature of the air 100, suitable not to alter the cotton fiber.

Furthermore, the reservoir 5 should be capacious enough to meet the requirements of a double compression measurement.

Preferably, the reservoir 5 has a capacity between 0.05 and 20 liters, preferably between 0.1 and 10 liters.

Preferably, the reservoir 5 is maintained at a predetermined pressure.

Still preferably, the reservoir 5 is maintained at a constant pressure.

It should be noted that the reservoir 5 is maintained at a pressure regulated between 0.05 and 4 bar, preferably between 0.1 and 2 bar.

The measuring device 1 can comprise even two or more reservoirs 5.

Therefore, the measuring device 1 according to the present invention uses a management of the air different from what has been adopted so far, through which it is possible to obtain measures stable over time and related to the stability of the climatic conditions of the laboratory where the instrument is located, since the air 100 is accumulated at determined characteristics, and not taken directly from the conditioned environment during the measurement, thus such as to reduce possible perturbations by the operator.

Preferably, the pump 6 is placed upstream of the measuring chamber 2 and reservoir 5.

The reservoir 5 is further upstream of the measuring chamber 2.

In other words, the pump 6 is the first element of the pneumatic circuit while the reservoir 5 is the second element of the pneumatic circuit.

In such case, preferably, the pump 6 is a diaphragm pump or a hydraulic pump.

Preferably, the pump 6 is a variable speed pump having a flow rate greater than 1 l/min.

Particularly, the pump 6 is such as not to alter the characteristics of relative humidity and temperature of the transported air 100.

Still preferably, the flow regulator 7 is piezoelectric.

Advantageously, the measurement time is reduced, and particularly remarkably lower (being around 10 seconds) than that required in the case of known equipment.

Alternatively, the regulator could be of another typology, for example a piston regulator.

The flow regulator 7 is variable.

Particularly, the flow regulator 7 is regulatable on two predetermined flow rates for performing the two different measurements, i.e., fineness and maturity.

More preferably, the flow regulator 7 is configured to vary the air flow from a first flow rate to a second flow rate and vice versa depending on the measurement to be performed. For example, the flow regulator 7 is configured to vary the air flow from a flow rate of 4 l/min to 1 l/min between a first compression condition and a second compression condition according to a closed-loop feedback control by an algorithm actuated by a related controller.

The measuring device 1 further comprises a pressure sensor 8.

Such pressure sensor 8 is configured to measure the pressure in the measuring chamber 2 in proximity of the head portion 42 after compressing the sample C, pressure depending on the resistance opposed by the sample C and on the amount of air come out from the measuring chamber 2.

The pressure sensor 8 is arranged to detect the pressure in the inner channel 40 of the plunger 4.

Preferably, the pressure sensor 8 is disposed outside the measuring chamber 2.

It should be noted that when the compression is carried out, after an initial transient, the flow is stabilised. During the measure of the pressure, the flow is thus constant through cotton.

Particularly, for the purposes of the measurement, the pressure in the inner channel 40 of the plunger is assumed to be constant and the same being present upstream of the sample C inside the measuring chamber 2.

The plunger 4 is preferably pneumatic.

The plunger 4 is connected, at the tail portion 41, to a linear actuator 400 configured to push the plunger 4 into the measuring chamber 2.

Preferably, the measuring device 1 comprises such linear actuator 400.

Particularly, the linear actuator 400 is configured to make the plunger 4 run the two predetermined strokes cited above, particularly a first stroke, corresponding to a first compression condition in the measuring chamber 2, and a second stroke, corresponding to a second compression condition in the measuring chamber 2.

The measuring device 1 is connectable to a processing unit 9. Particularly, the pressure sensor 8 is configured to be placed in signal communication with such processing unit 9.

The processing unit 9 is adapted to collect one or more pressure values measured by the pressure sensor 8 and to provide a measure of fineness and/or maturity.

The measuring device 1 according to the present invention, according to the preferred embodiment, uses a diaphragm or hydraulic pump 6, which accumulates the conditioned air 100 in one or more reservoirs 5, from which, by a piezoelectric flow regulator 7 of high accuracy, precision and reduced stabilising time, the air 100 can then flow through the cotton samples C to be tested, located in the measuring chamber 2, with an exiting air flow, i.e., subsequently release the air 100 outside the instrument at the end of the measure.

Advantageously, the Micronaire (fineness) and the maturity can be measured according to the applicable standards (ISO 2403 2014, UNI EN ISO 10306).

Advantageously, conditioned, and non-compressed, air can be used for the purposes of the measurement.

Advantageously, furthermore, the measure time can be reduced.

Advantageously, the measure can be made independent of external perturbations in the space which is adjacent to the instrument and used by the operator.

Advantageously, the dependence of the measure by the operator can be reduced.

Advantageously, accurate and precise measures can be obtained.

Advantageously, the stability of the measurement can be long-term bound to the climatic conditions of the laboratory subjected to standard ASTM D1776.

The measuring device thus conceived is susceptible of a number of modifications and variations, all falling within the scope of the inventive concept; furthermore, all the details are replaceable by technically equivalent elements. In practice, the used materials, as long as compatible with the specific use, as well as the contingent shapes and size, can be any depending on the technical requirements.

The invention claimed is:

1. A measuring device for measuring fineness or maturity of cotton fibers, said measuring device comprising:
    a measuring chamber configured to accommodate a sample of cotton fibers, said measuring chamber extending between a first end closed by a wall having one or more vent holes and a second end opposed to the first end;
    a tubular plunger configured to penetrate within said measuring chamber through said second end to run at least two strokes of predetermined lengths; said plunger having an inner channel extending between a tail portion and a perforated head portion placing said inner channel in fluid communication with said measuring chamber;

a seal between an outer surface of the tubular plunger and an inner surface of the measuring chamber;

a linear actuator connected to the tubular plunger;

a reservoir placed upstream of said inner channel and in fluid communication with said inner channel;

a pump configured to fill said reservoir with air from an environment;

a flow regulator placed downstream of said reservoir and upstream of said inner channel; said flow regulator being configured to ensure that the air accumulated in the reservoir moves into the inner channel, and consequently into the measuring chamber, with a predetermined flow rate a pressure sensor configured to determine the pressure in said inner channel; and a processor configured to determine the fineness or maturity of the cotton fibers from the output of the pressure sensor.

2. The measuring device according to claim 1, wherein said pump is placed upstream of the measuring chamber and the reservoir and is a diaphragm pump or a hydraulic pump.

3. The measuring device according to claim 1, wherein said flow regulator is piezoelectric.

4. The measuring device according to claim 3, wherein said pump is a variable speed pump having a flow rate greater than 1 l/min.

5. The measuring device according to claims claim 1, wherein said reservoir has a capacity between 0.05 and 20 liters.

6. The measuring device according to claim 1, wherein said reservoir is maintained at a pressure regulated between 0.05 and 4 bar.

7. The measuring device according to claim 6, wherein said flow regulator is configured to vary an air flow rate from 4 l/min to 1 l/min between a first compression condition and a second compression condition according to a closed-loop feedback control.

* * * * *